May 24, 1932.     R. A. FORESMAN     1,860,239
POWDERED FUEL FURNACE
Filed April 10, 1924     2 Sheets-Sheet 2

R.A.Foresman
INVENTOR

BY J.C.Davis
ATTORNEY

Patented May 24, 1932

1,860,239

UNITED STATES PATENT OFFICE

ROBERT A. FORESMAN, OF MOORES, PENNSYLVANIA, ASSIGNOR TO WESTINGHOUSE ELECTRIC & MANUFACTURING COMPANY, A CORPORATION OF PENNSYLVANIA

POWDERED FUEL FURNACE

Application filed April 10, 1924. Serial No. 705,670.

This invention relates to boiler furnaces and particularly to furnaces for burning finely divided fuel in suspension, and it has for an object the provision of means in apparatus of the character described which shall effect a rapid and substantially complete combustion of comminuted fuel, an efficient utilization of the heat of combustion, and a ready separation of the ash from the gases of combustion.

A further object of my invention is to provide a furnace construction which shall permit a rectilinear travel of the comminuted fuel during combustion, and which shall make available the heat of the furnace waste gases for preheating the air and for drying the fuel prior to their delivery to the furnace.

Figure 1:
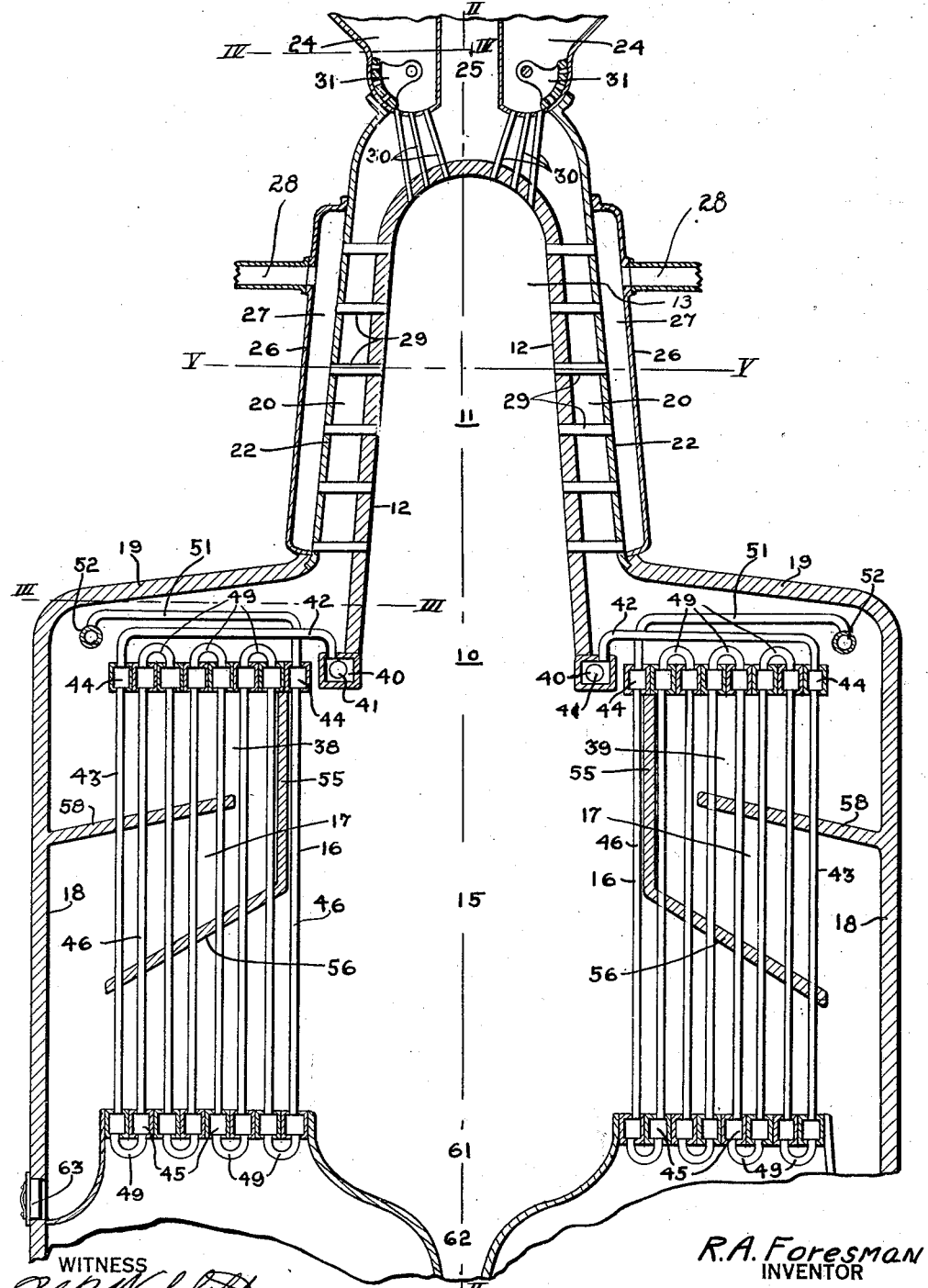
Figure 2:
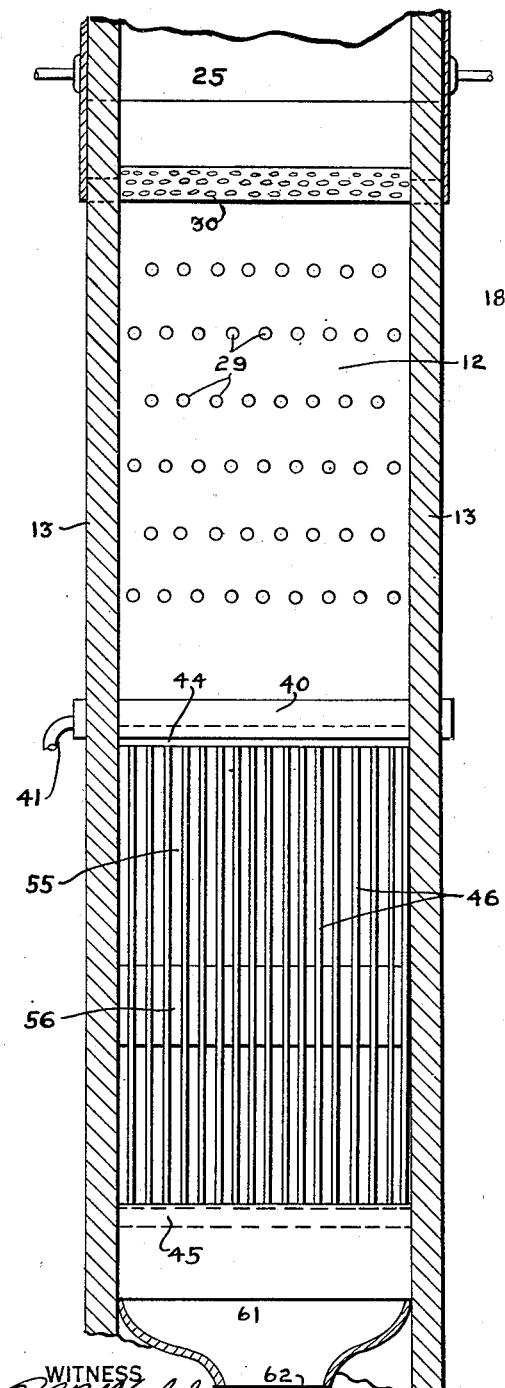
Figure 3:
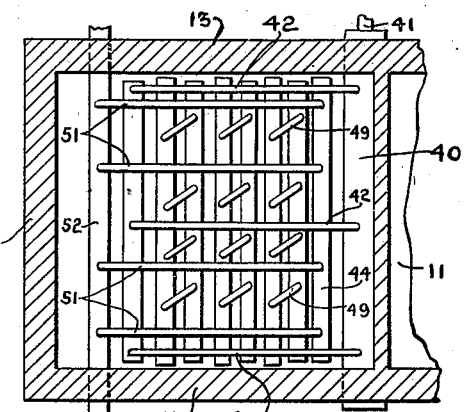
Figure 4:
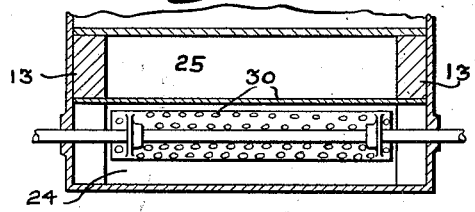
Figure 5:
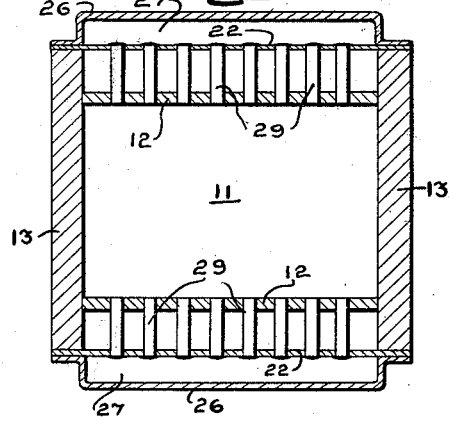

In the accompanying drawings, Fig. 1 is a view in vertical longitudinal section through a boiler furnace embodying my invention; Fig. 2 is a view in vertical transverse section on the line II—II of Fig. 1; Fig. 3 is a fragmentary view in section on the line III—III of Fig. 1; Fig. 4 is a fragmentary view of the fuel distributors taken on the line IV—IV of Fig. 1; and Fig. 5 is a sectional view of the combustion compartment taken on line V—V of Fig. 1.

The efficient burning of comminuted fuel in suspension seems to necessitate that the fuel particles shall be united with the required amount of oxygen and completely burned before the suspended burning particles and hot ash are permitted to contact with the furnace walls or with the heating surfaces of the boiler. The length of time required to effect this completed combustion has made, in furnaces heretofore employed, the rectilinear travel of fuel during combustion impractical, and resulted in the employment of various expedients to prolong the path of travel of the fuel particles, as for example, by causing them to travel in tortuous paths of which the U-shaped, helical and spiral paths are most common.

In the apparatus of the present invention I am enabled to effect an efficient combustion of comminuted fuel during the rectilinear travel of the fuel particles by providing two distinct regions of activity in an elongated, vertically-extending combustion chamber; first igniting and burning the falling fuel in an upper reverberatory region having enveloping walls constructed to minimize dissipation of heat therethrough and to reflect the heat therefrom into the zone of active combustion therein, and second, in a lower region absorbing the heat of the incandescent gases and of the radiant ash passing downwardly therethrough from the upper region. In carrying out this process, a cloud of fine fuel is caused to drop by gravity through a vertically elongated combustion chamber, the rate of falling of the fuel impeded by the introduction of cross currents of air and the ready ignition and rapid combustion of the fuel effected by the maintenance of high combustion temperatures in the upper portion of the combustion chamber. The distance traversed by any suspended particle of fuel in being completely burned, therefore, is much less by reason of its retarded speed in falling and the more rapid combustive action maintained than has heretofore been practicable. Furthermore, this disposition of the combustion chamber with respect to the heating surfaces of the boiler enables a sufficient fall of the fuel to be provided to effect substantially complete combustion before subjecting the burning fuel to the cooling effect of the heating surfaces of the boiler.

In the drawings, I show a furnace consisting of a vertically elongated combustion chamber 10 having an upper compartment or combustion space 11 enclosed by refractory side walls 12 and refractory end walls 13, and a lower compartment 15 defined at the sides by heat-absorbing surfaces 16 of a boiler 17, hereinafter more fully described, and at the ends by refractory walls 13. The furnace and boiler are encased, as shown, by the end walls 13 and outer side walls 18, which serve at their upper ends 19 to direct the combustion gases from the boiler 17 into the flue gas chambers 20 contiguous to the walls 12 of the combustion space 11. The flue gas chambers 20 are illustrated as formed by the side walls 12 and by walls 22 spaced therefrom, the latter walls extending upward to fuel hoppers 24. The chambers 20 conjoin above the combustion space 11 into an off-take flue 25. The bottom and side walls of the hoppers 24 are thus exposed to the waste gases, the heat of which serves to dry and to heat the fuel within the hoppers. Wall members 26 spaced from and secured to the walls 22 form therewith air boxes 27 which receive air under pressure through conduits 28. Tubes 29 secured in walls 22 and 12 connect the air boxes 27 with the interior of the combustion space 11 and traverse the flue gas chamber 20 so as to preheat the air delivered to the combustion space.

Comminuted fuel is fed into the top of the combustion chamber 11 from the hoppers 24 through tubes 30 which preferably traverse the flue gas chamber 20 so as to preheat the fuel entering the combustion space. A valve 31 disposed in the hopper 24 is adapted to cover or uncover the upper ends of the tubes 30 and thus to control the quantity of fuel admitted to the combustion chamber.

The boiler 17, as shown, is a vertical tubular boiler having two units 38, 39 one at either side of the chamber 15. It is to be understood, however, that any suitable type of boiler may be employed and that the boiler may be disposed at one side only of the chamber 15, if desired. Feed water heaters 40 support the walls 12 at their bases and are provided with inlet connections 41 and distributing pipes 42. Each boiler unit consists of a plurality of vertically-disposed sections 43 comprising a horizontally extending upper header 44 and a similarly disposed lower header 45 connected by a plurality of tubes 46. Water is conveyed from the feed water heater 40 through the pipes 42 to the upper header 44 of the rear-most section 43. Pipes 49, preferably of U-shaped conformation to permit relative expansion of the several sections, connect the upper headers and the lower headers, respectively, in groups of two, in such manner that water, or water and steam, passes downwardly through the tubes of the rear-most sections, upwardly through the tubes of the adjacent section, and so on alternately downwardly and upwardly through the several sections, finally passing upwardly through the section 43 bordering on the chamber 15 and thence through pipes 51 to a manifold 52, whence the steam is led to use.

The boiler units 38, 39 are provided with suitable baffles which are preferably constructed to cause the products of combustion to pass downwardly the length of the combustion chamber 10 and then to be sharply diverted among the boiler tubes. In the embodiment herein illustrated, I provide baffles 55 behind the foremost sections 43, forming the heat-absorbing surfaces 16 above referred to as bounding the heating compartment 15, which baffles extend downwardly from the upper headers 44 fully half the distance to the lower headers 45, and then rearwardly and downwardly through the tubes 46 as indicated at 56. Baffles 58 extend from the walls 18 into the bank of tubes 46 above the baffle 56 in such manner as to cause tortuous passages of the gases among the boiler tubes.

Suitable means are provided for the removal of the solid products of combustion from the bottom of the combustion chamber 10. This may be a sloping pit 61 having a slag opening 62 at the bottom as shown in Figs. 1 and 2. Clean-out openings 63 may also be provided at the rear of the boiler units.

Having described an embodiment of my invention, a brief description of the operation thereof is hereinbelow given. The hoppers 24 are filled with comminuted fuel either by automatic machinery or by hand, and the valve 31 adjusted to permit a desired flow of fuel through the tubes 30 to the upper portion of the combustion chamber 11. The fuel admitted from the tubes 30 falls in a cloud or shower and is met by cross currents of air from the tubes 29 which retard the fall and thoroughly mix the fuel with the air. Ignition of the fuel takes place almost immediately upon fuel entering the compartment 11 and combustion proceeds therein with great rapidity due to the fact that all the walls surrounding the combustion compartment are of refractory material which reflects or reverberates the radiant heat of combustion from the walls into the space in which the ignition and combustion of the fuel is taking place. There is thus maintained a high temperature combustion of sufficient intensity to effect a substantially complete burning of the solid constituents of the fuel within the compartment 11.

The hot gases and ash, the latter in the form of molten slag, pass downward into the heating compartment 15 where both the hot gases and the molten slag give off their heat to the heating surfaces 16 of the boiler. The height of the compartment 15 is preferably such that the molten slag falling therethrough gives up a major portion of the available heat therein and is caught in the pit 61 in a solidified condition which permits the ready removal thereof. The gaseous products of combustion are sharply diverted at the bottom of the compartment 15 through the boiler tubes beneath the baffle 56. The gases are then re-directed over the baffle 58, back and forth across the boiler tubes and finally pass to the chamber 20 where they serve to heat the entering air and fuel and thence to the off-take 25.

The improved combustion realized in the furnace of the present invention, is attained by reason of the great height of the combustion chamber, which permits a sufficient length of rectilinear travel of the fuel to obtain a complete combustion thereof during the combustion period, and of the slag to permit the abstraction of the available heat during the heat absorption period, and, further, by reason of the fact that the combustion and absorption processes are largely distinct, enabling the high temperature and rapid combustion of the fuel in the first stages of the fall of the fuel to be carried on without subjecting the combustive action to the cooling effects of heat-absorbing surfaces. The thorough mixing action of the cross jets of air, retarding the rate of falling of the fuel particles, and the preheating of the fuel and the air by the waste gases are also contributing factors in the high efficiency obtained in this furnace.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a furnace for burning powdered fuel, the combination of refractory walls defining a combustion space, side walls arranged exteriorly of the refractory walls and forming with said refractory walls flue gas off-take means, other wall members arranged exteriorly of the side walls and forming air boxes in cooperation with said side walls, said air boxes being in heat exchange relation with the flue gas off-take means, and a plurality of conduits extending through the flue gas off-take means from the air boxes to the combustion space for further abstracting heat from the escaping flue gases.

2. In a powdered fuel furnace of the down-feed type, the combination of refractory walls defining a combustion space, wall elements arranged exteriorly of the refractory walls and spaced therefrom to define flue gas off-take means, a fuel hopper arranged above the combustion space and in heat exchange relation with the off-take means and means for conducting fuel from the hopper through the flue gas off-take means to the combustion space in relatively small passages for heating said fuel by the escaping flue gases before admission to the combustion chamber.

3. In a powdered fuel furnace of the down-feed type, the combination of refractory walls defining a combustion space, wall elements arranged exteriorly of the refractory walls and spaced therefrom to define flue gas off-take means, a fuel hopper arranged above the combustion space and in heat exchange relation with the off-take means, and means for conducting fuel from the hopper through the flue gas off-take means to the combustion space in relatively small passages for heating said fuel by the escaping flue gases before admission to the combustion space, and means connecting with the combustion space and arranged exteriorly of the flue gas off-take in heat exchange relation therewith for supplying air under pressure to the combustion space.

4. In a furnace for burning powdered fuel, the combination of walls defining a compartment, a steam generator located within the compartment, walls projecting upwardly from the compartment to define an elongated vertically arranged combustion space closed at its upper end and communicating at its lower end with the interior of the compartment to provide a vertically arranged rectilinear passage horizontally offset with respect to the steam generator and extending from the upper portion of the combustion space to the lower portion of the compartment, means for admitting powdered fuel at the upper portion of the combustion space, and means for injecting air to the combustion space in a transverse direction so as to retard the downward flow of fuel and effect a substantially complete combustion thereof during its downward flow, and means for deflecting the gaseous products of combustion about the heat absorbing surfaces of the steam generator.

5. In a furnace for burning powdered fuel, the combination of walls defining a compartment, a steam generator positioned within the compartment, walls projecting upwardly from the compartment to define an elongated vertically arranged combustion space closed at its upper end and communicating at its lower end with the interior of the compartment to provide a vertically arranged rectilinear passage horizontally offset with respect to the generator and extending from the upper portion of the combustion space to the lower portion of the compartment, means for admitting powdered fuel at the upper portion of the combustion space, means for injecting air to the combustion space at vertically spaced points and in a transverse direction so as to retard the downward flow of fuel and effect a substantially complete combustion thereof during its downward flow, means for deflecting the gaseous products of combustion about the heat absorbing surfaces of the steam generator, and side walls arranged exteriorly of the walls which define the combustion space and forming with said walls a flue gas off-take passage communicating at its lower end with the interior of the compartment at points arranged above the steam generator.

6. In a furnace for burning powdered fuel the combination of walls defining a compartment, a steam generator positioned within the compartment, walls projecting upwardly from the compartment to define an elongated vertically arranged combustion space closed at its upper end and communicating at its lower end with the interior of the compartment to provide a vertically arranged rectilinear passage horizontally offset with respect to the generator and extending from the upper portion of the combustion space to the lower portion of the compartment, means for admitting powdered fuel at the upper portion of the combustion space, means for injecting air to the combustion space at vertically spaced points and in a transverse direction so as to retard the downward flow of fuel and effect a substantially complete combustion thereof during its downward flow, means for deflecting the gaseous products of combustion about the heat absorbing surfaces of the steam generator, side walls arranged exteriorly of the walls which define the combustion space and forming with said walls a flue gas offtake passage communicating at its lower end with the interior of the compartment at points arranged above the steam generator, and other wall members arranged exteriorly of the side walls to form an air box, the air box being in heat exchange relation with the flue gas offtake passage and in communication with the air injecting means.

7. In a furnace for burning powdered fuel, the combination of walls defining a compartment, a steam generator positioned within the compartment, walls projecting upwardly from the compartment to define an elongated vertically arranged combustion space closed at its upper end and communicating at its lower end with the interior of the compartment to provide a vertically arranged rectilinear passage horizontally offset with respect to the generator and extending from the upper portion of the combustion space to the lower portion of the compartment, means for admitting powdered fuel at the upper portion of the combustion space, means for injecting air to the combustion space at vertically spaced points and in a transverse direction so as to retard the downward flow of fuel and effect a substantially complete combustion thereof during its downward flow, means for deflecting the gaseous products of combustion about the heat absorbing surfaces of the steam generator, side walls arraged exteriorly of the walls which define the combustion space and forming with said walls a flue gas offtake passage communicating at its lower end with the interior of the compartment at points arranged above the steam generator, and a fuel hopper arranged above the combustion space, the fuel hopper being in heat exchange relation with the flue gas offtake and in communication with the fuel admitting means.

8. In a furnace for burning powdered fuel, the combination of walls defining a compartment, a steam generator positioned within the compartment, walls projecting upwardly from the compartment to define an elongated vertically arranged combustion space closed at its upper end and communicating at its lower end with the interior of the compartment to provide a vertically arranged rectilinear passage horizontally offset with respect to the generator and extending from the upper portion of the combustion space to the lower portion of the compartment, means for admitting powdered fuel at the upper portion of the combustion space, means for injecting air to the combustion space at vertically spaced points and in a transverse direction so as to retard the downward flow of fuel and effect a substantially complete combustion thereof during its downward flow, means for deflecting the gaseous products of combustion about the heat absorbing surfaces of the steam generator, side walls arranged exteriorly of the walls which define the combustion space and forming with said walls a flue gas offtake passage communicating at its lower end with the interior of the compartment at points arranged above the steam generator, other wall members arranged exteriorly of the side walls to form an air box, the air box being in heat exchange relation with the flue gas offtake and in communication with the air injecting means, and a fuel hopper arranged above the combustion space, the fuel hopper being in heat exchange relation with the flue gas offtake and in communication with the fuel admitting means.

9. In a furnace for burning powdered fuel, the combination of refractory walls defining a combustion space, side walls arranged exteriorly of the refractory walls and forming with said refractory walls flue gas offtake means, other wall members arranged exteriorly of the side walls and forming air boxes in cooperation with said side walls, said air boxes being in heat-exchange relation with the flue gas offtake means, means providing communication between said air boxes and said combustion space, a tubular boiler arranged beneath the combustion space and defining a lower compartment beneath said combustion space, and means for diverting the gaseous products of combustion among the tubes of the boiler and thence outwardly and upwardly through the flue gas offtake means.

10. In a furnace for burning powdered fuel, the combination of refractory walls defining a combustion space, side walls arranged exteriorly of the refractory walls and forming with said refractory walls flue gas offtake means, other wall members arranged exteriorly of the side walls and forming air boxes in cooperation with said side walls, said air boxes being in heat-exchange relation with the flue gas offtake means, means providing communication between said air boxes and said combustion space, a fuel hopper arranged above the combustion space and in heat-exchange relation with the flue gas offtake means, and a plurality of relatively small conduits extending from the hopper downwardly through the flue gas offtake means and the refractory walls into the combustion space.

11. In a powdered fuel furnace, the combination with means defining a compartment, said means including a boiler having tubes arranged in groups, of refractory walls extending upwardly from the upper sides of the compartment and defining a combustion space communicating with the compartment, flue gas offtake means arranged contiguous to and exteriorly of the refractory walls and forming a passage for the gases from the compartment through the tube groups, a wall forming with the gas offtake means an air chamber in heat-exchange relation with said offtake means, a plurality of conduits connecting said air chamber with the combustion space and extending through the gas offtake means, a fuel-feeding device arranged above the combustion space, and means for preheating the fuel from the fuel-feeding device by the exhaust gases before entering the combustion space.

12. In a powdered fuel furnace, the combination with means defining a compartment, said means including a boiler having tubes arranged in groups, of refractory walls extending upwardly from the upper sides of the compartment and defining a combustion space communicating with the compartment, flue gas offtake means arranged contiguous to and exteriorly of the refractory walls and forming a passage for the gases from the compartment through the tube groups, a wall forming with the gas offtake means an air chamber in heat-exchange relation with said offtake means, a plurality of conduits connecting said air chamber with the combustion space and extending through the gas offtake means, a fuel-feeding device arranged above the combustion space, means for preheating the fuel from the fuel-feeding device by the exhaust gases before entering the combustion space, and inwardly sloping walls disposed at the bottom of the compartment forming withdrawal means for the solid products of combustion.

13. In a furnace for burning powdered fuel, the combination of refractory walls defining a combustion space, side walls arranged exteriorly of the refractory walls and forming with said refractory walls flue gas offtake means, other wall members arranged exteriorly of the side walls and forming air boxes in cooperation with said side walls, said air boxes being in heat-exchange relation with the flue gas offtake means, means providing communication between said air boxes and said combustion space, a fuel hopper arranged above the combustion space and in heat-exchange relation with the flue gas offtake means, and means for conducting fuel from the hopper to the combustion space.

14. In a furnace for burning powdered fuel, the combination of refractory walls defining a combustion space, side walls arranged exteriorly of the refractory walls and forming with said refractory walls flue gas offtake means, other wall members arranged exteriorly of the side walls and forming air boxes in cooperation with said side walls, said air boxes being in heat-exchange relation with the flue gas offtake means, means providing communication between said air boxes and said combustion space, a fuel hopper arranged above the combustion space and in heat-exchange relation with the flue gas offtake means, and means for conducting fuel from the hopper to the combustion space, said last-mentioned means being in heat conducting relation with the gas offtake means.

In testimony whereof I have hereunto subscribed my name this eighth day of April, 1924.

ROBERT A. FORESMAN.